United States Patent
Chen et al.

(10) Patent No.: US 11,693,211 B2
(45) Date of Patent: Jul. 4, 2023

(54) CAMERA OPTICAL LENS

(71) Applicant: Raytech Optical (Changzhou) Co., Ltd, Changzhou (CN)

(72) Inventors: Chenxiyang Chen, Shenzhen (CN); Wen Sun, Shenzhen (CN)

(73) Assignee: Raytech Optical (Changzhou) Co., Ltd., Changzhou (CN)

(*) Notice: Subject to any disclaimer, the term of this patent is extended or adjusted under 35 U.S.C. 154(b) by 401 days.

(21) Appl. No.: 17/138,816

(22) Filed: Dec. 30, 2020

(65) Prior Publication Data

US 2022/0091393 A1    Mar. 24, 2022

(30) Foreign Application Priority Data

Sep. 19, 2020 (CN) .......................... 202010989334.1

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 9,013,813 B2* | 4/2015 | Chang | G02B 9/60 359/740 |
| 2014/0139719 A1* | 5/2014 | Fukaya | G02B 27/0025 348/340 |
| 2014/0153113 A1* | 6/2014 | Tsai | G02B 9/62 359/713 |
| 2015/0338616 A1* | 11/2015 | Hsu | G02B 5/208 359/713 |
| 2016/0349486 A1* | 12/2016 | Teraoka | G02B 13/0045 |
| 2021/0116683 A1* | 4/2021 | Chen | G02B 13/0045 |

* cited by examiner

*Primary Examiner* — Darryl J Collins
(74) *Attorney, Agent, or Firm* — W&G Law Group (57) ABSTRACT

A camera optical lens includes five-piece lenses, from an object side to an image side. The camera optical lens satisfies conditions of $0.65 \leq f1/f \leq 0.85$, $1.20 \leq (R7+R8)/(R7-R8) \leq 1.75$, $-40.00 \leq f3/f \leq -20.00$, $0.50 \leq d5/d6 \leq 0.80$ and $1.00 \leq d8/d9 \leq 1.30$. Here f denotes a focal length of the camera optical lens, f1 denotes a focal length of the first lens, f3 denotes a focal length of the third lens, R7 denotes a curvature radius of an object-side surface of the fourth lens, R8 denotes a curvature radius of an image-side surface of the fourth lens, d5 denotes an on-axis thickness of the third lens, d6 denotes an on-axis distance from an image-side surface of the third lens to the object-side surface of the fourth lens. The camera optical lens of the present disclosure has excellent optical performances, and meanwhile can meet design requirements of a large aperture, a wide angle and ultra-thin.

10 Claims, 7 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, a five-piece structure gradually appear in lens designs. Although the five-piece lens already has good optical performance, its focal power, lens spacing and lens shape are still unreasonable, resulting in the lens structure still cannot meet the design requirements of a large aperture, ultra-thin and a wide angle while having good optical performance.

Therefore, it is necessary to provide an imaging optical lens that has better optical performance and meets design requirements of a large aperture, a wide angle and ultra-thin.

SUMMARY

An objective of the present disclosure is to provide a camera optical lens, which has excellent optical performances, and meanwhile can meet design requirements of a large aperture, a wide angle and ultra-thin.

To solve the above problems, some embodiments of the present disclosure is to provides a camera optical lens including five-piece lenses, from an object side to an image side, the five-piece lenses are: a first lens having a positive refractive power, a second lens having a negative refractive power, a third lens having a negative refractive power, a fourth lens having a positive refractive power, and a fifth lens having a negative refractive power.

The camera optical lens satisfies conditions of $0.65 \leq f1/f \leq 0.85$, $1.20 \leq (R7+R8)/(R7-R8) \leq 1.75$, $-40.00 \leq f3/f \leq -20.00$, $0.50 \leq d5/d6 \leq 0.80$, and $1.00 \leq d8/d9 \leq 1.30$. Herein f denotes a focal length of the camera optical lens, f1 denotes a focal length of the first lens, f3 denotes a focal length of the third lens, R7 denotes a curvature radius of an object-side surface of the fourth lens, R8 denotes a curvature radius of an image-side surface of the fourth lens, d5 denotes an on-axis thickness of the third lens, d6 denotes an on-axis distance from an image-side surface of the third lens to the object-side surface of the fourth lens, d8 denotes an on-axis distance from the image-side surface of the fourth lens to an object-side surface of the fifth lens, and d9 denotes an on-axis thickness of the fifth lens.

Preferably, the camera optical lens further satisfies a condition of $1.50 \leq (R3+R4)/(R3-R4) \leq 4.00$. Herein R3 denotes a curvature radius of an object-side surface of the second lens, and R4 denotes a curvature radius of an image-side surface of the second lens.

Preferably, the camera optical lens further satisfies conditions of $-4.28 \leq (R1+R2)/(R1-R2) \leq -0.75$, and $0.06 \leq d1/TTL \leq 0.19$. Herein R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image surface of the camera optical lens along an optical axis.

Preferably, the camera optical lens further satisfies conditions of $-6.10 \leq f2/f \leq -0.88$, and $0.03 \leq d3/TTL \leq 0.08$. Herein f2 denotes a focal length of the second lens, and d3 denotes an on-axis thickness of the second lens.

Preferably, the camera optical lens further satisfies conditions of $-41.60 \leq (R5+R6)/(R5-R6) \leq -6.32$, and $0.03 \leq d5/TTL \leq 0.12$. Herein R5 denotes a curvature radius of an object-side surface of the third lens, and R6 denotes a curvature radius of the image-side surface of the third lens.

Preferably, the camera optical lens further satisfies conditions of $0.30 \leq f4/f \leq 0.99$, and $0.07 \leq d7/TTL \leq 0.21$. Herein f4 denotes a focal length of the fourth lens, and d7 denotes an on-axis thickness of the fourth lens L4.

Preferably, the camera optical lens further satisfies conditions of $-0.99 \leq f5/f \leq -0.32$, $-0.67 \leq (R9+R10)/(R9-R10) \leq 0.21$, and $0.03 \leq d9/TTL \leq 0.12$. Herein f5 denotes a focal length of the fifth lens, R9 denotes a curvature radius of the object-side surface of the fifth lens, and R10 denotes a curvature radius of an image-side surface of the fifth lens.

Preferably, the camera optical lens further satisfies a condition of $TTL/IH \leq 1.35$. Herein IH denotes an image height of the camera optical lens.

Preferably, the camera optical lens further satisfies a condition of $FOV \geq 79.00°$. Herein FOV denotes an field of view of the camera optical lens.

Preferably, the camera optical lens further satisfies a condition of $FNO \leq 2.21$. Herein FNO denotes an F number of the camera optical lens.

Advantageous effects of the present disclosure are that, the camera optical lens has excellent optical performances, and also has a large aperture, a wide angle, and is ultra-thin. The camera optical lens is especially suitable for mobile camera lens components and WEB camera lens composed of high pixel CCD, CMOS.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
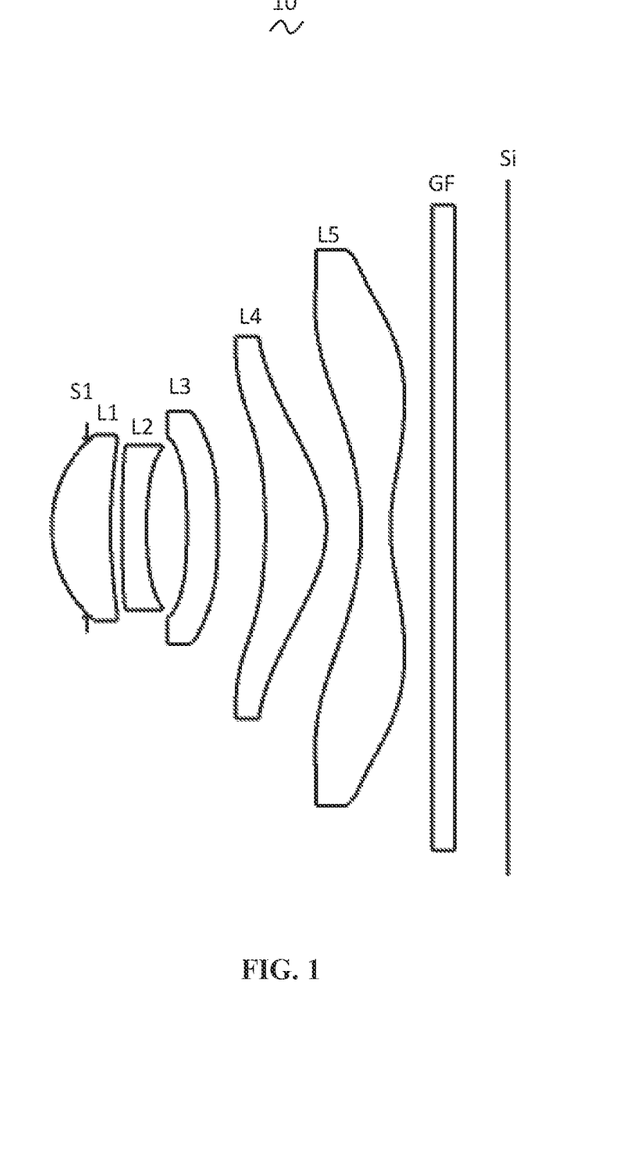
FIG. 1 shows a schematic diagram of a structure of a camera optical lens according to Embodiment 1 of the present disclosure.

Referring to the drawings, the present disclosure provides a camera optical lens 10. FIG. 1 shows a schematic diagram of a structure of a camera optical lens according to Embodiment 1 of the present disclosure. The camera optical lens 10 includes five lenses. Specifically, the camera optical lens 10 including, from an object side to an image side: an aperture S1, a first lens L1, a second lens L2, a third lens L3, a fourth lens L4 and a fifth lens L5. An optical filter such as an optical filter may be arranged between the fifth lens L5 and an image surface Si.

In the embodiment, the first lens L1 has a positive refractive power, the second lens L2 has a negative refractive power, the third lens L3 has a negative refractive power, the fourth lens L4 has a positive refractive power, and the fifth lens L5 has a negative refractive power.

In the embodiment, the first lens L1, the second lens L2, the third lens L3, the fourth lens L4 and the fifth lens L5 are all made of plastic material. In other embodiments, each lens may also be of another material.

In the embodiment, a focal length of the camera optical lens 10 is defined as f, a focal length of the first lens L1 is defined as f1, and the camera optical lens 10 satisfies a condition of $0.65 \leq f1/f \leq 0.85$, which stipulates a ratio of the focal length f1 of the first lens L1 to the focal length f of the camera optical lens 10. Whining this range, it is beneficial to an aberration correction, thereby improving an imaging quality.

A curvature radius of an object-side surface of the fourth lens L4 is defined as R7, a curvature radius of an image-side surface of the fourth lens L4 is defined as R8, and the camera optical lens 10 further satisfies a condition of $1.20 \leq (R7+R8)/(R7-R8) \leq 1.75$, which stipulates a shape of the fourth lens L4, within this range, a degree of deflection of light passing through the lens can be alleviated, and aberrations can be reduced effectively.

A focal length of the third lens L3 is defined as f3, and the camera optical lens 10 further satisfies a condition of $-40.00 \leq f3/f \leq -20.00$, which stipulates a ratio of the focal length f3 of the third lens L3 to the focal length f of the camera optical lens 10. Whining this range, it is beneficial to improve an imaging quality.

An on-axis thickness of the third lens L3 is defined as d5, an on-axis distance from an image-side surface of the third lens L3 to the object-side surface of the fourth lens L4 is defined as d6, and the camera optical lens 10 further satisfies a condition of $0.50 \leq d5/d6 \leq 0.80$. Within this range, it is beneficial to reduce a system sensitivity and improve productivity.

An on-axis distance from the image-side surface of the fourth lens L4 to an object-side surface of the fifth lens L5 is defined as d8, an on-axis thickness of the fifth lens L5 is defined as d9, and the camera optical lens 10 further satisfies a condition of $1.00 \leq d8/d9 \leq 1.30$. Within this range, it is convenient for lenses assembly.

A curvature radius of an object-side surface of the second lens L2 is defined as R3, a curvature radius of an image-side surface of the second lens L2 is defined as R4, and the camera optical lens 10 further satisfies condition of $1.50 \leq (R3+R4)/(R3-R4) \leq 4.00$, which stipulates a shape of the second lens L2. Within this range, it is beneficial to an aberration correction, thereby improving an imaging quality.

In the embodiment, an object-side surface of the first lens L1 is convex in a paraxial region, and an image-side surface of the first lens L1 is concave in the paraxial region.

A curvature radius of the object-side surface of the first lens L1 is defined as R1, a curvature radius of the image-side surface of the first lens L1 is defined as R2, and the camera optical lens 10 further satisfies a condition of $-4.28 \leq (R1+R2)/(R1-R2) \leq -0.75$. By reasonably controlling a shape of the first lens L1, so that the first lens L1 can effectively correct a spherical aberration of the system. Preferably, the camera optical lens 10 further satisfies a condition of $-2.67 \leq (R1+R2)/(R1-R2) \leq -0.94$.

An on-axis thickness of the first lens L1 is defined as d1, a total optical length from the object-side surface of the first lens L1 to an image surface of the camera optical lens 10 along an optical axis is defined as TTL, and the camera optical lens 10 further satisfies a condition of $0.06 \leq d1/TTL \leq 0.19$. Within this range, it is beneficial to achieve ultra-thin. Preferably, the camera optical lens 10 further satisfies a condition of $0.10 \leq d1/TTL \leq 0.15$.

In the embodiment, the object-side surface of the second lens L2 is convex in the paraxial region, and the image-side surface of the second lens L2 is concave in the paraxial region.

a focal length of the second lens L2 is defined as f2, and the camera optical lens 10 further satisfies a condition of $-6.10 \leq f2/f \leq -0.88$. By controlling the focal length of the second lens L2 within a reasonably range, it is beneficial to correct aberrations of the system. Preferably, the camera optical lens 10 further satisfies a condition of $-3.81 \leq f2/f \leq -1.10$.

An on-axis thickness of the second lens L2 is defined as d3, and the camera optical lens 10 further satisfies a condition of $0.03 \leq d3/TTL \leq 0.08$. Within this range, it is beneficial to achieve ultra-thin. Preferably, the camera optical lens 10 further satisfies a condition of $0.04 \leq d3/TTL \leq 0.06$.

In the embodiment, an object-side surface of the third lens L3 is concave in the paraxial region, and an image-side surface of the third lens L3 is convex in the paraxial region.

A curvature radius of the object-side surface of the third lens is defined as R5, a curvature radius of the image-side surface of the third lens is defined as R6, and the camera optical lens 10 further satisfies a condition of $-41.60 \leq (R5+R6)/(R5-R6) \leq -6.32$, which stipulates a shape of the third lens L3, within this range, a degree of deflection of light passing through the lens can be alleviated, and aberrations can be reduced effectively. Preferably, the camera optical lens 10 further satisfies a condition of $-26.00 \leq (R5+R6)/(R5-R6) \leq -7.90$.

Furthermore, the camera optical lens 10 further satisfies a condition of $0.03 \leq d5/TTL \leq 0.12$. Within this range, it is beneficial to achieve ultra-thin. Preferably, the camera optical lens 10 further satisfies a condition of $0.05 \leq d5/TTL \leq 0.09$.

In the embodiment, the object-side surface of the fourth lens L4 is concave in the paraxial region, and the image-side surface of the fourth lens L4 is convex in the paraxial region.

A focal length of the fourth lens L4 is defined as f4, and the camera optical lens 10 further satisfies a condition of $0.30 \leq f4/f \leq 0.99$. By a reasonable distribution of the focal length, which makes the system has an excellent imaging quality and a lower sensitivity. Preferably, the camera optical lens 10 further satisfies a condition of $0.48 \leq f4/f \leq 0.79$.

A curvature radius of the object-side surface of the fourth lens L4 is d7, and the camera optical lens 10 further satisfies a condition of $0.07 \leq d7/TTL \leq 0.21$. Within this range, it is beneficial to achieve ultra-thin. Preferably, the camera optical lens 10 further satisfies a condition of $0.11 \leq d7/TTL \leq 0.17$.

In the embodiment, the object-side surface of the fifth lens L5 is convex in the paraxial region, and an image-side surface of the fifth lens L5 is convex in the paraxial region.

A focal length of the fifth lens L5 is defined as f5, and the camera optical lens 10 further satisfies a condition of $-0.99 \leq f5/f \leq -0.32$. By stipulating the fifth lens L5, which can effectively smooth light angle of the camera lens and reduce tolerance sensitivity. Preferably, the camera optical lens 10 further satisfies a condition of $-0.62 \leq f5/f \leq -0.40$.

A curvature radius of the object-side surface of the fifth lens L5 is defined as R9, a curvature radius of the image-side surface of the fifth lens L5 is defined as R10, and the camera optical lens 10 further satisfies a condition of $-0.67 \leq (R9+R10)/(R9-R10) \leq 0.21$, which stipulates a shape of the fifth lens L5. Within this range, a development towards ultra-thin and a wide angle lenses would facilitate correcting a problem of an off-axis aberration. Preferably, the camera optical lens 10 further satisfies a condition of $-0.42 \leq (R9+R10)/(R9-R10) \leq 0.17$.

An on-axis thickness of the fifth lens L5 is defined as d9, and the camera optical lens 10 further satisfies a condition of $0.03 \leq d9/TTL \leq 0.12$. Within this range, it is beneficial to achieve ultra-thin. Preferably, the camera optical lens 10 further satisfies a condition of $0.05 \leq d9/TTL \leq 0.09$.

It should be noted that, in other embodiments, the object-side surface and the image-side surface of the first lens L1, the second lens L2, the third lens L3, the fourth lens L4, and the fifth lens L5 may also be set to other concave or convex distribution situations.

In the embodiment, an image height of the camera optical lens 10 is defined as IH, and the camera optical lens 10 further satisfies a condition of $TTL/IH \leq 1.35$, which is beneficial to achieve ultra-thin.

In the embodiment, an field of view (FOV) the camera optical lens 10 is greater than or equal to 79.00°, thereby achieving a wide angle.

In the embodiment, an F number (FNO) of the camera optical lens 10 is defined as FNO, and an FNO value of the camera optical lens 10 is less than or equal to 2.21, thereby facilitating to realization of a large aperture.

When satisfying above conditions, which makes the camera optical lens has excellent optical performances, and meanwhile can meet design requirements of a large aperture, a wide angle and ultra-thin. According the characteristics of the camera optical lens, it is particularly suitable for a mobile camera lens component and a WEB camera lens composed of high pixel CCD, CMOS.

In the following, embodiments will be used to describe the camera optical lens 10 of the present disclosure. The symbols recorded in each embodiment will be described as follows. The focal length, on-axis distance, curvature radius, on-axis thickness, inflexion point position, and arrest point position are all in units of mm.

TTL. Optical length (the total optical length from the object-side surface of the first lens L1 to the image surface Si of the camera optical lens along the optical axis) in mm.

The F number (FNO) means a ratio of an effective focal length of the camera optical lens to an entrance pupil diameter (ENPD).

Preferably, inflexion points and/or arrest points can be arranged on the object-side surface and the image-side surface of the lens, so as to satisfy the demand for high quality imaging. The description below can be referred for specific implementations.

Table 1 and Table 2 show design data of the camera optical lens 10 shown in FIG. 1.

TABLE 1

| | R | d | | nd | | vd |
|---|---|---|---|---|---|---|
| S1 | ∞ | d0 = | −0.333 | | | |
| R1 | 1.229 | d1 = | 0.551 | nd1 | 1.5444 | v1 | 56.03 |
| R2 | 4.345 | d2 = | 0.109 | | | |
| R3 | 10.049 | d3 = | 0.230 | nd2 | 1.6614 | v2 | 20.41 |
| R4 | 3.258 | d4 = | 0.379 | | | |
| R5 | −8.809 | d5 = | 0.291 | nd3 | 1.6614 | v3 | 20.41 |
| R6 | −9.932 | d6 = | 0.445 | | | |
| R7 | −5.044 | d7 = | 0.575 | nd4 | 1.5444 | v4 | 56.03 |
| R8 | −1.037 | d8 = | 0.328 | | | |
| R9 | −2.356 | d9 = | 0.271 | nd5 | 1.5352 | v5 | 56.12 |
| R10 | 1.780 | d10 = | 0.396 | | | |
| R11 | ∞ | d11 = | 0.210 | ndg | 1.5168 | vg | 64.17 |
| R12 | ∞ | d12 = | 0.500 | | | |

Herein, meanings of various symbols will be described as follows.

S1: aperture.

R: curvature radius of an optical surface, a central curvature radius for a lens.

R1: curvature radius of the object-side surface of the first lens L1.

R2: curvature radius of the image-side surface of the first lens L1.

R3: curvature radius of the object-side surface of the second lens L2.

R4: curvature radius of the image-side surface of the second lens L2.

R5: curvature radius of the object-side surface of the third lens L3.

R6: curvature radius of the image-side surface of the third lens L3.

R7: curvature radius of the object-side surface of the fourth lens L4.

R8: curvature radius of the image-side surface of the fourth lens L4.

R9: curvature radius of the object-side surface of the fifth lens L5.

R10: curvature radius of the image-side surface of the fifth lens L5.

R11: curvature radius of an object-side surface of the optical filter (GF).

R12: curvature radius of an image-side surface of the optical filter (GF).

d: on-axis thickness of a lens and an on-axis distance between lens.

d0: on-axis distance from the aperture Si to the object-side surface of the first lens L1.

d11: on-axis thickness of the optical filter (GF).

d12: on-axis distance from the image-side surface of the optical filter (GF) to the image surface Si.

nd: refractive index of a d line.

nd1: refractive index of the d line of the first lens L1.

nd2: refractive index of the d line of the second lens L2.

nd3: refractive index of the d line of the third lens L3.

nd4: refractive index of the d line of the fourth lens L4.

nd5: refractive index of the d line of the fifth lens L5.

ndg: refractive index of the d line of the optical filter (GF).

vd: abbe number.

v1: abbe number of the first lens L1.

v2: abbe number of the second lens L2.

v3: abbe number of the third lens L3.

v4: abbe number of the fourth lens L4.

v5: abbe number of the fifth lens L5.

vg: abbe number of the optical filter (GF).

Table 2 shows aspherical surface data of each lens of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −1.0231E−01 | 4.6729E−03 | 7.8538E−02 | −2.7547E−01 | 7.2309E−01 | −1.0270E+00 |
| R2 | −3.7463E+01 | 5.1627E−03 | −2.2991E−01 | 1.2287E+00 | −3.0136E+00 | 4.2000E+00 |
| R3 | 1.0191E+02 | −1.1782E−01 | 1.9513E−01 | 1.0615E−01 | −3.1198E−01 | −3.6374E−01 |
| R4 | 1.5184E+01 | −1.3925E−01 | 1.2017E+00 | −6.0767E+00 | 2.1046E+01 | −4.2317E+01 |
| R5 | −6.8111E−01 | −2.5743E−01 | 5.2259E−01 | −3.6134E+00 | 1.3091E+01 | −2.5624E−01 |
| R6 | 3.1890E+01 | −1.4676E−01 | −1.0544E−01 | 3.9468E−01 | −7.8490E−01 | 1.0389E+00 |
| R7 | −2.7664E+01 | −6.4296E−02 | 5.9664E−02 | −1.2982E−01 | 1.3283E−01 | −6.0951E−02 |
| R8 | −1.1842E−00 | 2.4539E−01 | −2.3059E−01 | 1.8200E−01 | −9.1968E−02 | 2.7515E−02 |
| R9 | −2.2589E+01 | −6.5250E−02 | 2.9858E−02 | −5.6866E−03 | 7.8979E−04 | −1.3695E−04 |
| R10 | −1.2946E+01 | −73058E−02 | 3.6584E−02 | −1.4778E−02 | 3.7906E−03 | −5.9750E−04 |

| | Conic coefficient | Aspheric surface coefficients | |
|---|---|---|---|
| | k | A14 | A16 |
| R1 | −1.0231E−01 | 7.8910E−01 | −2.4642E−01 |
| R2 | −3.7463E+01 | −3.2597E+00 | 1.0318E+00 |
| R3 | 1.0191E+02 | 9.9396E−01 | −6.3090E−01 |
| R4 | 1.5184E+01 | 4.5321E+01 | −2.0323E+01 |
| R5 | −6.8111E−01 | 2.6425E+01 | −1.1373E+01 |
| R6 | 3.1890E+01 | −6.5718E−01 | 1.4281E−01 |
| R7 | −2.7664E+01 | 1.3125E−02 | −1.0883E−03 |
| R8 | −1.1842E+00 | −4.4471E−03 | 3.0022E−04 |
| R9 | −2.2589E+01 | 1.9661E−05 | −1.1798E−06 |
| R10 | −1.2946E+01 | 5.4393E−05 | −2.1687E−06 | d1: on-axis thickness of the first lens L1.

d2: on-axis distance from the image-side surface of the first lens L1 to the object-side surface of the second lens L2.

d3: on-axis thickness of the second lens L2.

d4: on-axis distance from the image-side surface of the second lens L2 to the object-side surface of the third lens L3.

d5: on-axis thickness of the third lens L3.

d6: on-axis distance from the image-side surface of the third lens L3 to the object-side surface of the fourth lens L4.

d7: on-axis thickness of the fourth lens L4.

d8: on-axis distance from the image-side surface of the fourth lens L4 to the object-side surface of the fifth lens L5.

d9: on-axis thickness of the fifth lens L5.

d10: on-axis distance from the image-side surface of the fifth lens L5 to the object-side surface of the optical filter (GF).

Herein, K is a conic coefficient, and A4, A6, A8, A10, A12, A14, and A16 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16} \quad (1).$$

Herein, x is a vertical distance between a point on an aspheric curve and the optical axis, and y is a depth of the aspheric surface (the vertical distance between the point x from the optical axis on the aspheric surface and a tangent plane tangent to a vertex on the optical axis of the aspheric surface).

For convenience, an aspheric surface of each lens surface uses the aspheric surfaces shown in the above condition (1). However, the present disclosure is not limited to the aspherical polynomials form shown in the condition (1).

Table 3 and Table 4 show design data of inflexion points and arrest points of the camera optical lens 10 according to Embodiment 1 of the present disclosure. Herein P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 0 | / | / | / |
| P1R2 | 1 | 0.725 | / | / |
| P2R1 | 1 | 0.755 | / | / |
| P2R2 | 0 | / | / | / |
| P3R1 | 0 | / | / | / |
| P3R2 | 0 | / | / | / |
| P4R1 | 1 | 1.105 | / | / |
| P4R2 | 1 | 0.935 | / | / |
| P5R1 | 2 | 1.225 | 2.325 | / |
| P5R2 | 3 | 0.535 | 2.205 | 2.475 |

TABLE 4

| | Number of arrest points | Arrest point position 1 | Arrest point position 2 |
|---|---|---|---|
| P1R1 | 0 | / | / |
| P1R2 | 1 | 0.885 | / |
| P2R1 | 0 | / | / |
| P2R2 | 0 | / | / |
| P3R1 | 0 | / | / |
| P3R2 | 0 | / | / |
| P4R1 | 1 | 1.665 | / |
| P4R2 | 0 | / | / |
| P5R1 | 2 | 2.145 | 2.425 |
| P5R2 | 1 | 1.215 | / |

Figure 2:
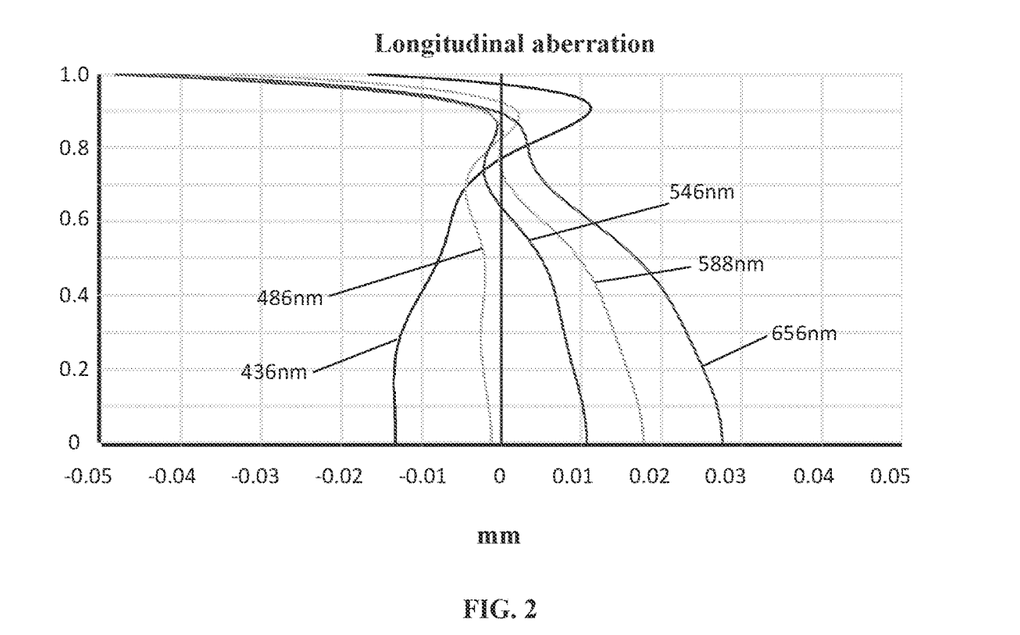
FIG. 2 is a schematic diagram of a longitudinal aberration of the camera optical lens shown in FIG. 1.
Figure 3:
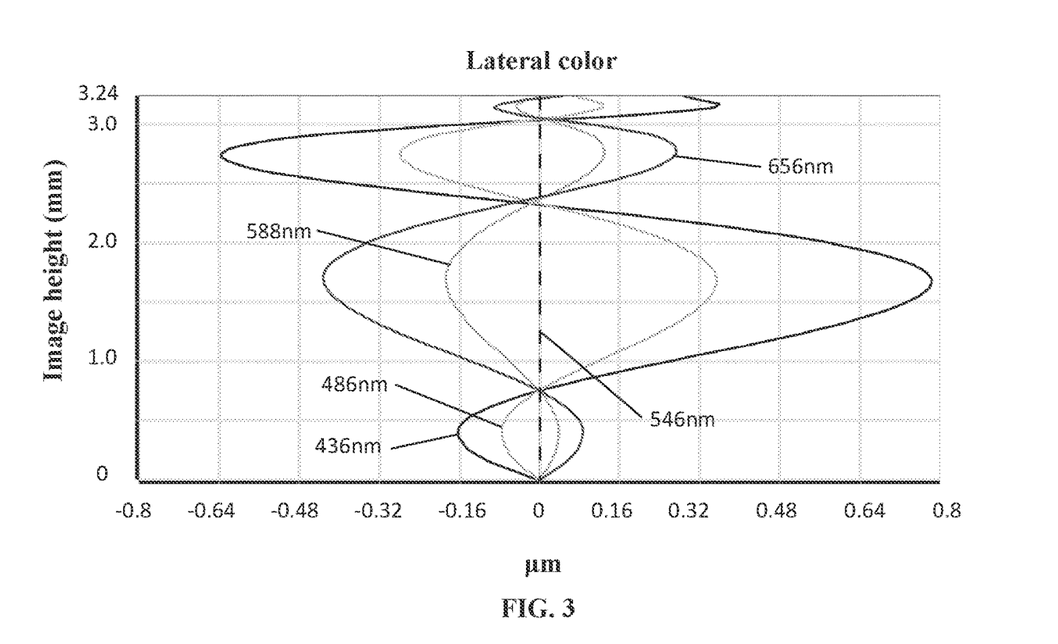
FIG. 3 shows a schematic diagram of a lateral color of the camera optical lens shown in FIG. 1.
Figure 4:
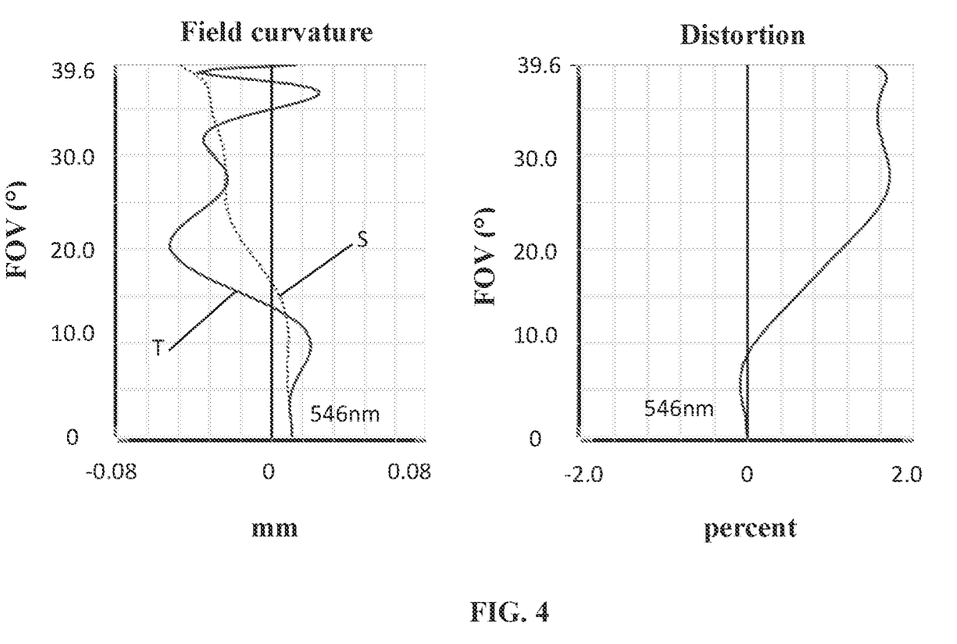
FIG. 4 shows a schematic diagram of a field curvature and a distortion of the camera optical lens shown in FIG. 1.

FIG. 2 and FIG. 3 illustrate a longitudinal aberration and a lateral color with wavelengths of 436 nm, 486 nm, 546 nm, 588 nm and 656 nm after passing the camera optical lens 10 according to Embodiment 1, respectively. FIG. 4 illustrates a field curvature and a distortion with a wavelength of 546 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, and 3, and also values corresponding to parameters which are specified in the above conditions.

As shown in Table 13, Embodiment 1 satisfies the above conditions.

In the embodiment, an entrance pupil diameter (ENPD) of the camera optical lens 10 is 1.725 mm, an image height IH of 1.0H is 3.240 mm, an FOV (field of view) in a diagonal direction is 79.20°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Figure 5:
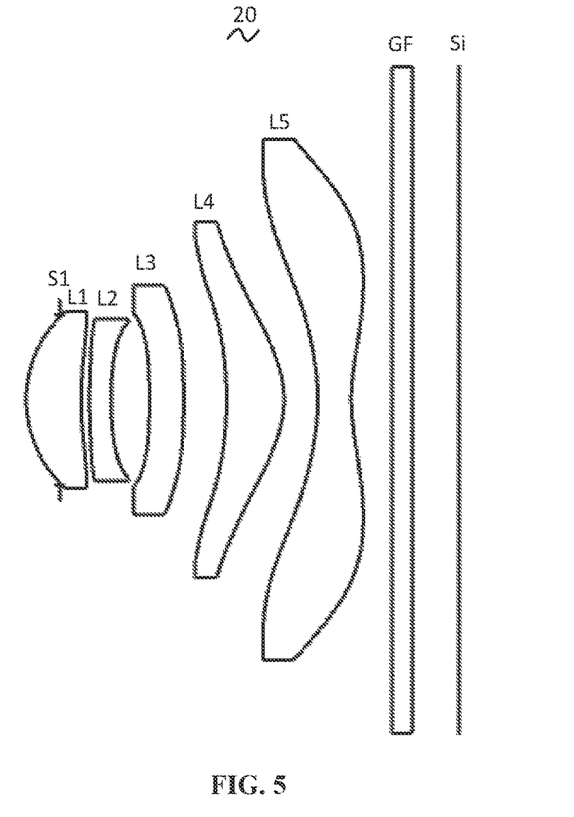
FIG. 5 shows a schematic diagram of a structure of a camera optical lens according to Embodiment 2 of the present disclosure.

FIG. 5 shows a schematic diagram of a structure of a camera optical lens according to Embodiment 2 of the present disclosure.

Table 5 and Table 6 show design data of a camera optical lens 20 in Embodiment 2 of the present disclosure.

TABLE 5

| | R | d | nd | | vd | |
|---|---|---|---|---|---|---|
| S1 | ∞ | d0 = −0.333 | | | | |
| R1 | 1.211 | d1 = 0.547 | nd1 | 1.5446 | v1 | 56.04 |
| R2 | 3.338 | d2 = 0.081 | | | | |
| R3 | 5.041 | d3 = 0.215 | nd2 | 1.6614 | v2 | 20.41 |
| R4 | 2.997 | d4 = 0.382 | | | | |
| R5 | −9.101 | d5 = 0.338 | nd3 | 1.6614 | v3 | 20.41 |
| R6 | −11.247 | d6 = 0.426 | | | | |
| R7 | −3.759 | d7 = 0.566 | nd4 | 1.5446 | v4 | 56.04 |
| R8 | −1.020 | d8 = 0.335 | | | | |
| R9 | −2.269 | d9 = 0.333 | nd5 | 1.5444 | v5 | 55.95 |
| R10 | 1.978 | d10 = 0.400 | | | | |
| R11 | ∞ | d11 = 0.210 | ndg | 1.5168 | vg | 64.17 |
| RI2 | ∞ | d12 = 0.453 | | | | |

Table 6 shows aspherical surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −1.1054E−01 | −1.2072E−02 | 1.3961E−01 | −3.7301E−01 | 7.0024E−01 | −9.3004E−01 |
| R2 | −3.8632E+01 | −1.2892E−02 | −2.6211E−01 | 1.2315E+00 | −2.9577E+00 | 4.1981E+00 |
| R3 | −5.1255E+01 | −1.5157E−01 | 2.0601E−01 | 2.7131E−01 | −2.6757E−01 | −5.7176E−01 |
| R4 | 1.2793E+01 | −1.9779E−01 | 1.2612E+00 | −5.9813E+00 | 2.0960E+01 | −4.2438E+01 |
| R5 | −3.1317E+01 | −2.3857E−01 | 5.5112E−01 | −3.5980E+00 | 1.2977E+01 | −2.5644E+01 |
| R6 | −8.2994E+01 | −1.2251E−01 | −8.9461E−02 | 3.8416E−01 | −7.9376E−01 | 1.0387E+00 |
| R7 | −2.2746E+01 | −6.6114E−02 | 6.5633E−02 | −1.2965E−01 | 1.3210E−01 | −6.1153E−02 |
| R8 | −1.0326E+00 | 2.5110E−01 | −2.2206E−01 | 1.8026E−01 | −9.2237E−02 | 2.7529E−02 |
| R9 | −2.3548E+01 | −7.1908E−02 | 3.0002E−02 | −5.6316E−03 | 7.9177E−04 | −1.3696E−04 |
| R10 | −1.2776E+01 | −7.9893E−02 | 3.7416E−02 | −1.4884E−02 | 3.7733E−03 | −5.9864E−04 |

TABLE 6-continued

|  | Conic coefficient | Aspheric surface coefficients | |
|---|---|---|---|
|  | k | A14 | A16 |
| R1 | −1.1054E−01 | 8.6590E−01 | −4.2234E−01 |
| R2 | −3.8632E+01 | −3.3565E+00 | 1.0199E+00 |
| R3 | −5.1255E+01 | 7.3093E−01 | −1.8958E−01 |
| R4 | 1.2793E+01 | 4.5599E+01 | −2.0296E+01 |
| R5 | −3.1317E+01 | 2.6645E+01 | −1.1491E+01 |
| R6 | −8.2994E+01 | −6.6340E−01 | 1.5506E−01 |
| R7 | −2.2746E+01 | 1.3112E−02 | −1.0602E−03 |
| R8 | −1.0326E+00 | −4.4388E−03 | 3.0125E−04 |
| R9 | −2.3548E+01 | 1.9620E−05 | −1.1764E−06 |
| R10 | −1.2776E+01 | 5.4458E−05 | −2.1239E−06 |

Table 7 and table 8 show design data of inflexion points and arrest points of each lens of the camera optical lens 20 lens according to Embodiment 2 of the present disclosure.

TABLE 7

|  | Number of inflexion points | Inflexion point position 1 | Inflexion point position 2 | Inflexion point position 3 |
|---|---|---|---|---|
| P1R1 | 0 | / | / | / |
| P1R2 | 1 | 0.575 | / | / |
| P2R1 | 0 | / | / | / |
| P2R2 | 0 | / | / | / |
| P3R1 | 0 | / | / | / |
| P3R2 | 0 | / | / | / |
| P4R1 | 1 | 1.075 | / | / |
| P4R2 | 1 | 0.925 | / | / |
| P5R1 | 2 | 1.325 | 2.355 | / |
| P5R2 | 3 | 0.535 | 2.425 | 2.455 |

TABLE 8

|  | Number of arrest points | Arrest point position 1 |
|---|---|---|
| P1R1 | 0 | / |
| P1R2 | 1 | 0.805 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 1 | 1.185 |

Figure 6:
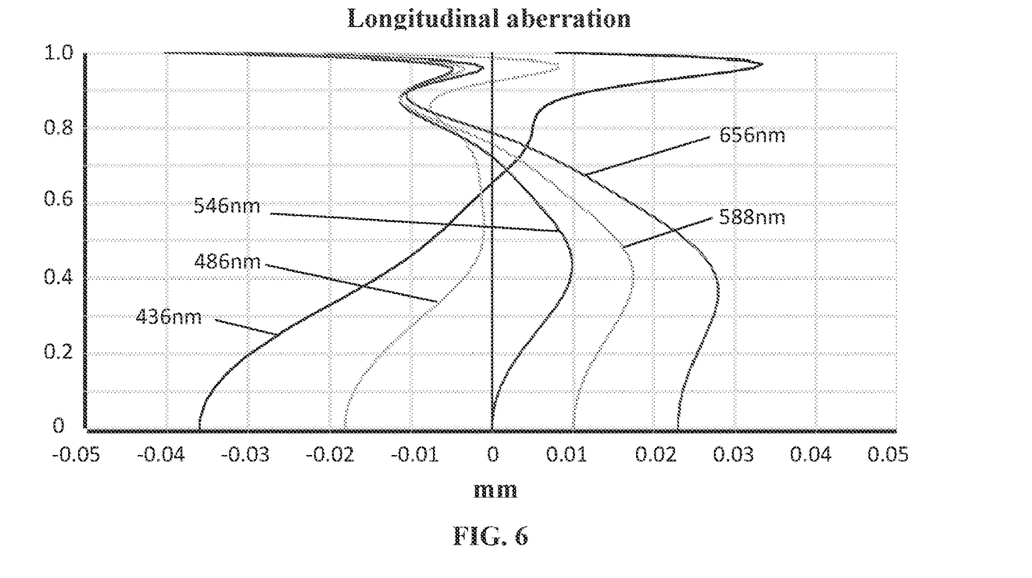
FIG. 6 shows a schematic diagram of a longitudinal aberration of the camera optical lens shown in FIG. 5.
Figure 7:
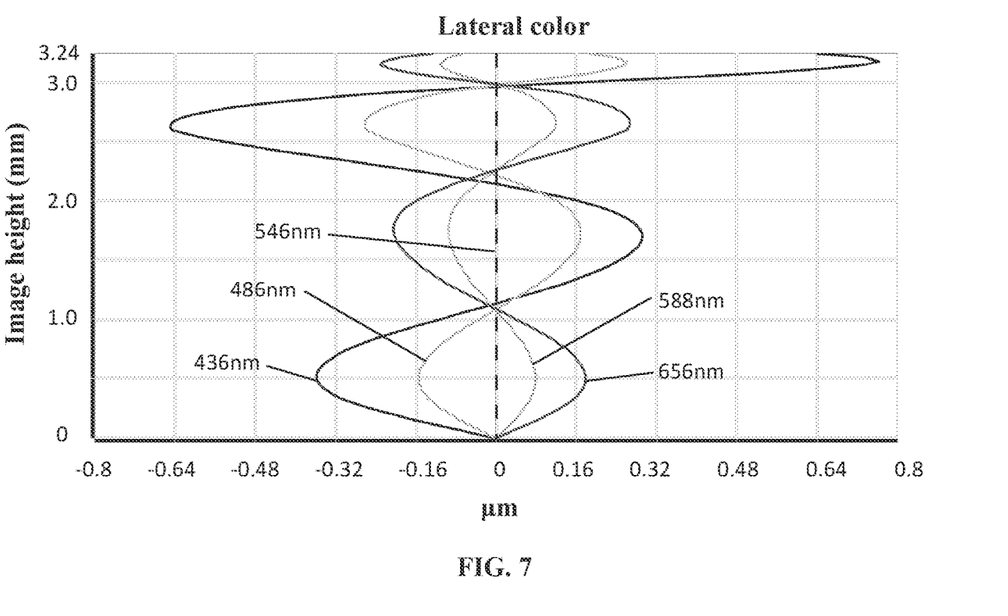
FIG. 7 shows a schematic diagram of a lateral color of the camera optical lens shown in FIG. 5.
Figure 8:
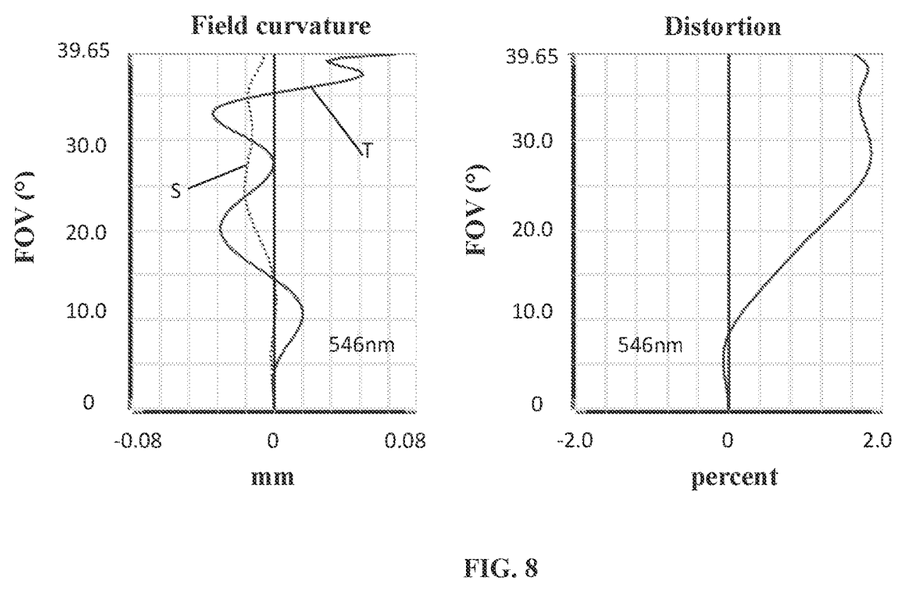
FIG. 8 shows a schematic diagram of a field curvature and a distortion of the camera optical lens shown in FIG. 5.

FIG. 6 and FIG. 7 illustrate a longitudinal aberration and a lateral color with wavelengths of 436 nm, 486 nm, 546 nm, 588 nm and 656 nm after passing the camera optical lens 20 according to Embodiment 2, respectively. FIG. 8 illustrates a field curvature and a distortion with a wavelength of 546 nm after passing the camera optical lens 20 according to Embodiment 2. A field curvature S in FIG. 8 is a field curvature in a sagittal direction, and T is a field curvature in a tangential direction.

As shown in Table 13, Embodiment 2 satisfies the above conditions.

In the embodiment, an entrance pupil diameter (ENPD) of the camera optical lens 20 is 1.719 mm, an image height IH of 1.0H is 3.240 mm, an FOV (field of view) in the diagonal direction is 79.300. Thus, the camera optical lens can meet the design requirements of a large aperture, a wide angle and ultra-thin, and its on-axis and off-axis chromatic aberrations are fully corrected, thereby achieving excellent optical characteristics.

Embodiment 3

Figure 9:
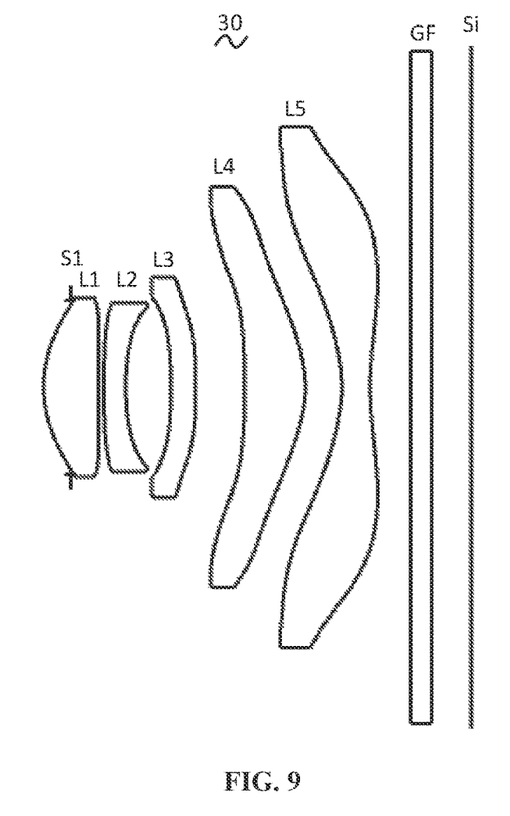
FIG. 9 shows a schematic diagram of a structure of a camera optical lens according to Embodiment 3 of the present disclosure.

FIG. 9 shows a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

|  | R | d |  | nd |  | vd |
|---|---|---|---|---|---|---|
| S1 | ∞ | d0 = | −0.261 |  |  |  |
| R1 | 1.293 | d1 = | 0.541 | nd1 | 1.5446 | v1 | 56.04 |
| R2 | 22.753 | d2 = | 0.051 |  |  |  |
| R3 | 12.548 | d3 = | 0.215 | nd2 | 1.6614 | v2 | 20.41 |
| R4 | 2.627 | d4 = | 0.444 |  |  |  |
| R5 | −8.108 | ds = | 0.244 | nd3 | 1.6614 | v3 | 20.41 |
| R6 | −8.927 | d6 = | 0.478 |  |  |  |
| R7 | −12.468 | d7 = | 0.596 | nd4 | 1.5446 | v4 | 56.04 |
| R8 | −1.257 | d8 = | 0.361 |  |  |  |
| R9 | −1.518 | d9 = | 0.279 | nd5 | 1.5444 | v5 | 55.95 |
| R10 | 3.053 | d10 = | 0.400 |  |  |  |
| R11 | ∞ | d11 = | 0.210 | ndg | 1.5168 | vg | 64.17 |
| R12 | ∞ | d12 = | 0.382 |  |  |  |

Table 10 shows aspherical surface data of each lens of the camera optical lens 30 in Embodiment 3 of the present disclosure.

TABLE 10

|  | Conic coefficient | Aspherical surface coefficients | | | | |
|---|---|---|---|---|---|---|
|  | k | A4 | A6 | A8 | A10 | A12 |
| R1 | −3.8517E−01 | −1.6972E−02 | 1.2650E−01 | −4.0167E−01 | 6.8014E−01 | −9.7225E−01 |
| R2 | 9.0011E+01 | −2.7127E−02 | −2.2077E−01 | 1.1309E+00 | −3.0733E+00 | 4.2097E+00 |
| R3 | 5.9033E+01 | 2.5700E−02 | 1.1455E−01 | 1.0194E−01 | −2.5828E−01 | −3.7123E−01 |

TABLE 10-continued

| | | | | | | |
|---|---|---|---|---|---|---|
| R4 | 9.2962E+00 | −7.0547E−02 | 1.1925E+00 | −6.2743E+00 | 2.0963E+01 | −4.1933E+01 |
| R5 | 3.5655E+01 | −2.5328E−01 | 4.5497E−01 | −3.4057E+00 | 1.3097E+01 | −2.5856E+01 |
| R6 | 5.3981E+01 | −2.0843E−01 | −5.3239E−02 | 4.0933E−01 | −7.6489E−01 | 1.0456E+00 |
| R7 | 2.5149E+01 | −8.0853E−02 | 6.1912E−02 | −1.2982E−01 | 1.3265E−01 | −6.0942E−02 |
| R8 | −9.8815E−01 | 2.3952E−01 | −2.2685E−01 | 1.8183E−01 | −9.2050E−02 | 2.7484E−02 |
| R9 | −1.0902E+01 | −6.3171E−02 | 3.0124E−02 | −5.6924E−03 | 7.8081E−04 | −1.3853E−04 |
| R10 | −1.5143E+01 | −7.6926E−02 | 3.5536E−02 | −1.4818E−02 | 3.7999E−03 | −5.9588E−04 |

| | Conic coefficient | Aspherical surface coefficients | |
|---|---|---|---|
| | k | A14 | A16 |
| R1 | −3.85171−01 | 7.8384E−01 | −3.5007E−01 |
| R2 | 9.0011E+01 | −3.2124E+00 | 1.0923E+00 |
| R3 | 5.9033E+01 | 9.5080E−01 | −3.5001E−01 |
| R4 | 9.2962E+00 | 4.5851E+01 | −2.1399E+01 |
| R5 | 3.5655E+01 | 2.6243E+01 | −1.0887E+01 |
| R6 | 5.3981E+01 | −6.6980E−01 | 1.4298E−01 |
| R7 | 2.5149E+01 | 1.3142E−02 | −1.0905E−04 |
| R8 | −9.8815E−01 | −4.4513E−03 | 2.9987E−04 |
| R9 | −1.0902E+01 | 1.9540E−05 | −1.1346E−06 |
| R10 | −1.5143E+01 | 5.4444E−05 | −2.1826E−06 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 0.765 | / | / |
| P1R2 | 1 | 0.285 | / | / |
| P2R1 | 0 | / | / | / |
| P2R2 | 0 | / | / | / |
| P3R1 | 0 | / | / | / |
| P3R2 | 2 | 0.815 | 0.995 | / |
| P4R1 | 2 | 1.165 | 1.775 | / |
| P4R2 | 3 | 0.945 | 1.485 | 1.925 |
| P5R1 | 2 | 1.195 | 2.245 | / |
| P5R2 | 3 | 0.535 | 2.205 | 2.535 |

TABLE 12

| | Number of arrest points | Arrest point position 1 |
|---|---|---|
| P1R1 | 0 | / |
| P1R2 | 1 | 0.485 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 1 | 1.075 |

Figure 10:
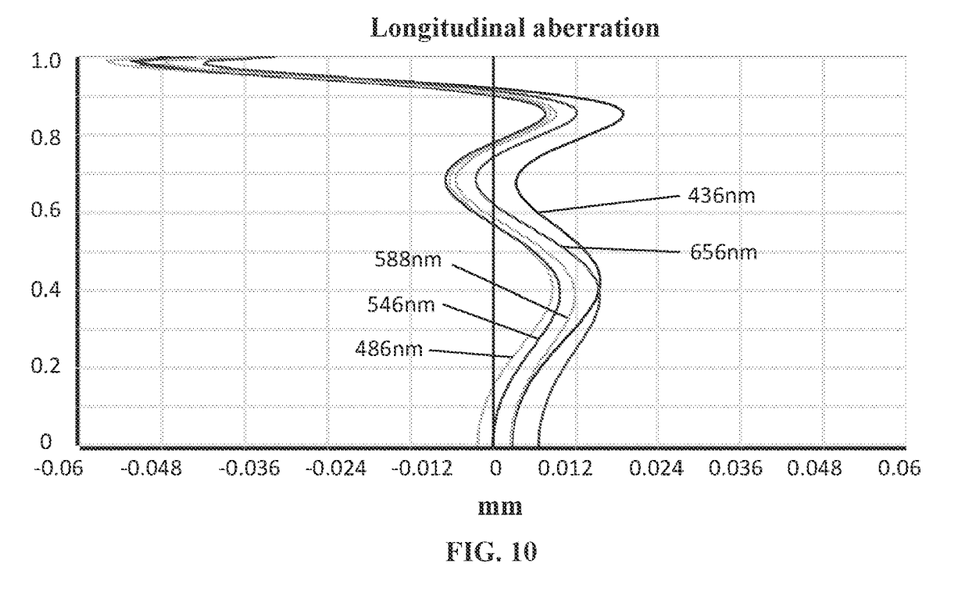
FIG. 10 shows a schematic diagram of a longitudinal aberration of the camera optical lens shown in FIG. 9.
Figure 11:
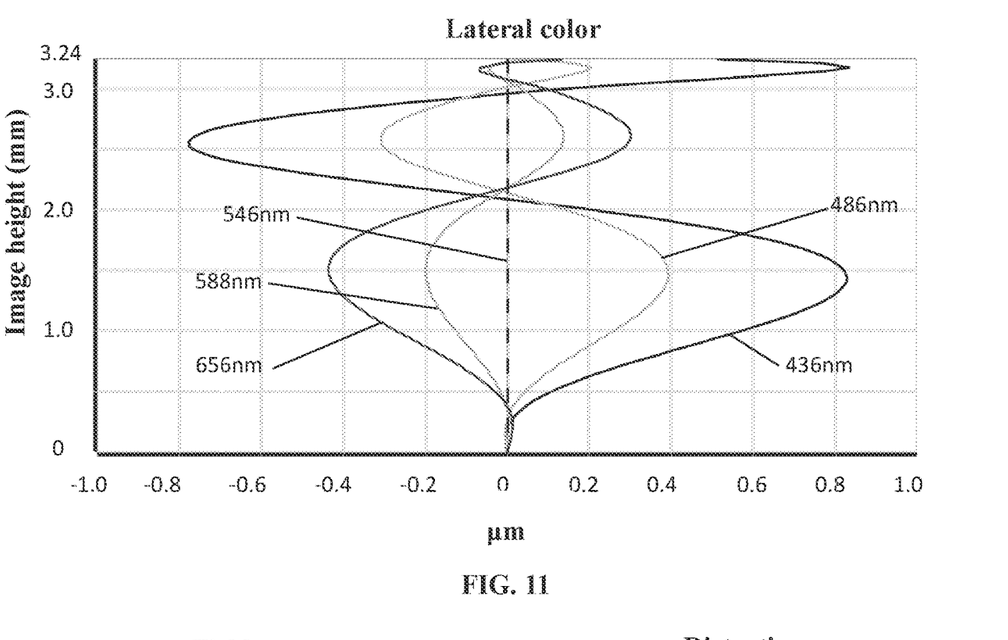
FIG. 11 shows a schematic diagram of a lateral color of the camera optical lens shown in FIG. 9.
Figure 12:
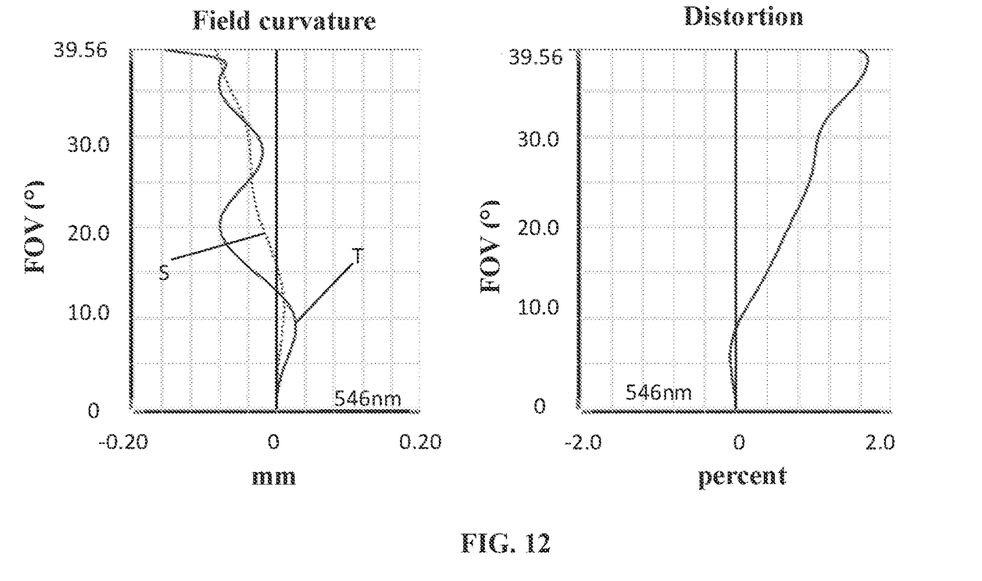
FIG. 12 shows a schematic diagram of a field curvature and a distortion of the camera optical lens shown in FIG. 9.

FIG. 10 and FIG. 11 illustrate a longitudinal aberration and a lateral color of light with wavelengths of 436 nm, 486 nm, 546 nm, 588 nm and 656 nm after passing the camera optical lens 30 according to Embodiment 3. FIG. 12 illustrates a field curvature and a distortion of light with a wavelength of 546 nm after passing the camera optical lens 30 according to Embodiment 3. A field curvature S in FIG. 12 is a field curvature in a sagittal direction, and T is a field curvature in a tangential direction.

Table 13 in the following shows various values of Embodiment 3, and also values corresponding to parameters which are specified in the above conditions. Obviously, the camera optical lens 30 satisfies above conditions.

In the embodiment, an entrance pupil diameter (ENPD) of the camera optical lens 30 is 1.723 mm, an image height IH of 1.0H is 3.240 mm, an FOV (field of view) in the diagonal direction is 79.12°. The camera optical lens can meet the design requirements of a large aperture, a wide angle and ultra-thin, and its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f1/f | 0.78 | 0.84 | 0.66 |
| (R7 + R8)/(R7 − R8) | 1.52 | 1.75 | 1.22 |
| f3/f | −34.15 | −20.12 | −39.56 |
| d5/d6 | 0.65 | 0.79 | 0.51 |
| d8/d9 | 1.21 | 1.01 | 1.29 |
| f | 3.805 | 3.783 | 3.792 |
| f1 | 2.951 | 3.187 | 2.486 |
| f2 | −7.304 | −11.539 | −5.011 |
| f3 | −129.954 | −76.116 | −150.008 |
| f4 | 2.272 | 2.385 | 2.508 |
| f5 | −1.844 | −1.881 | −1.815 |
| f12 | 4.197 | 3.965 | 4.008 |
| FNO | 2.21 | 2.20 | 2.20 |
| TTL | 4.285 | 4.286 | 4.201 |
| IH | 3.240 | 3.240 | 3.240 |
| FOV | 79.20° | 79.30° | 79.12° |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising five-piece lenses, from an object side to an image side, the five-piece lenses are:
   a first lens having a positive refractive power;
   a second lens having a negative refractive power;
   a third lens having a negative refractive power;
   a fourth lens having a positive refractive power; and
   a fifth lens having a negative refractive power;

wherein the camera optical lens satisfies following conditions:

$$0.65 \leq f1/f \leq 0.85;$$

$$1.20 \leq (R7+R8)/(R7-R8) \leq 1.75;$$

$$-40.00 \leq f3/f \leq -20.00;$$

$$0.50 \leq d5/d6 \leq 0.80; \text{ and}$$

$$1.00 \leq d8/d9 \leq 1.30;$$

where
f denotes a focal length of the camera optical lens;
f1 denotes a focal length of the first lens;
f3 denotes a focal length of the third lens;
R7 denotes a curvature radius of an object-side surface of the fourth lens;
R8 denotes a curvature radius of an image-side surface of the fourth lens;
d5 denotes an on-axis thickness of the third lens;
d6 denotes an on-axis distance from an image-side surface of the third lens to the object-side surface of the fourth lens;
d8 denotes an on-axis distance from the image-side surface of the fourth lens to an object-side surface of the fifth lens; and
d9 denotes an on-axis thickness of the fifth lens.

2. The camera optical lens according to claim 1 further satisfying following condition: $1.50 \leq (R3+R4)/(R3-R4) \leq 4.00$;
where
R3 denotes a curvature radius of an object-side surface of the second lens; and
R4 denotes a curvature radius of an image-side surface of the second lens.

3. The camera optical lens according to claim 1 further satisfying following conditions:

$$-4.28 \leq (R1+R2)/(R1-R2) \leq -0.75; \text{ and}$$

$$0.06 \leq d1/TTL \leq 0.19;$$

where
R1 denotes a curvature radius of an object-side surface of the first lens;
R2 denotes a curvature radius of an image-side surface of the first lens;
d1 denotes an on-axis thickness of the first lens; and
TTL denotes a total optical length from the object-side surface of the first lens to an image surface of the camera optical lens along an optical axis.

4. The camera optical lens according to claim 1 further satisfying following conditions:

$$-6.10 \leq f2/f \leq -0.88; \text{ and}$$

$$0.03 \leq d3/TTL \leq 0.08;$$

where
f2 denotes a focal length of the second lens;
d3 denotes an on-axis thickness of the second lens; and
TTL denotes a total optical length from an object-side surface of the first lens to an image surface of the camera optical lens along an optical axis.

5. The camera optical lens according to claim 1 further satisfying following conditions:

$$-41.60 \leq (R5+R6)/(R5-R6) \leq -6.32; \text{ and}$$

$$0.03 \leq d5/TTL \leq 0.12;$$

where
R5 denotes a curvature radius of an object-side surface of the third lens;
R6 denotes a curvature radius of the image-side surface of the third lens; and
TTL denotes a total optical length from an object-side surface of the first lens to an image surface of the camera optical lens along an optical axis.

6. The camera optical lens according to claim 1 further satisfying following conditions:

$$0.30 \leq f4/f \leq 0.99; \text{ and}$$

$$0.07 \leq d7/TTL \leq 0.21;$$

where
f4 denotes a focal length of the fourth lens;
d7 denotes an on-axis thickness of the fourth lens L4; and
TTL denotes a total optical length from an object-side surface of the first lens to an image surface of the camera optical lens along an optical axis.

7. The camera optical lens according to claim 1 further satisfying following conditions:

$$-0.99 \leq f5/f \leq -0.32;$$

$$-0.67 \leq (R9+R10)/(R9-R10) \leq 0.21; \text{ and}$$

$$0.03 \leq d9/TTL \leq 0.12;$$

where
f5 denotes a focal length of the fifth lens;
R9 denotes a curvature radius of the object-side surface of the fifth lens;
R10 denotes a curvature radius of an image-side surface of the fifth lens; and
TTL denotes a total optical length from an object-side surface of the first lens to an image surface of the camera optical lens along an optical axis.

8. The camera optical lens according to claim 1 further satisfying following condition:

$$TTL/IH \leq 1.35;$$

where
IH denotes an image height of the camera optical lens; and
TTL denotes a total optical length from an object-side surface of the first lens to an image surface of the camera optical lens along an optical axis.

9. The camera optical lens according to claim 1 further satisfying following condition:

$$FOV \geq 79.00°;$$

where
FOV denotes an field of view of the camera optical lens.

10. The camera optical lens according to claim 1 further satisfying following condition: $FNO \leq 2.21$;
where
FNO denotes an F number of the camera optical lens.

* * * * *